(12) United States Patent
Ratsaby et al.

(10) Patent No.: US 11,275,766 B2
(45) Date of Patent: Mar. 15, 2022

(54) METHOD AND APPARATUS FOR HIERARCHICAL GENERATION OF A COMPLEX OBJECT

(71) Applicant: EMC IP HOLDING COMPANY LLC, Hopkinton, MA (US)

(72) Inventors: Gil Ratsaby, Jerusalem (IL); Ron Arnan, Nes Ziona (IL); Hagay Dagan, Pardes Hanna (IL)

(73) Assignee: Dell Products, L.P., Hopkinton, MA (US)

( * ) Notice: Subject to any disclaimer, the term of this patent is extended or adjusted under 35 U.S.C. 154(b) by 0 days.

(21) Appl. No.: 16/901,428

(22) Filed: Jun. 15, 2020

(65) Prior Publication Data
US 2021/0390121 A1 Dec. 16, 2021

(51) Int. Cl.
*G06F 16/28* (2019.01)
*G06F 16/16* (2019.01)
*G06F 16/22* (2019.01)

(52) U.S. Cl.
CPC .......... *G06F 16/282* (2019.01); *G06F 16/168* (2019.01); *G06F 16/2246* (2019.01); *G06F 16/289* (2019.01)

(58) Field of Classification Search
CPC ...... G06F 16/2365; G06F 8/35; G06F 16/288; G06F 16/248; G06F 16/9577; G06F 40/174; G06F 16/2246; G06F 16/903; G06F 16/168; G06F 16/282; G06F 16/292

See application file for complete search history.

(56) References Cited

U.S. PATENT DOCUMENTS

| | | | |
|---|---|---|---|
| 2003/0204481 A1* | 10/2003 | Lau | ........................ G06F 8/34 |
| 2009/0177640 A1* | 7/2009 | Verbaere | ............. G06F 16/2425 |
| 2020/0005015 A1* | 1/2020 | Liang | ................. G06K 9/00201 |

* cited by examiner

*Primary Examiner* — Angelica Ruiz
(74) *Attorney, Agent, or Firm* — Anderson Gorecki LLP (57) ABSTRACT

A complex object generator is implemented, for example, as an integrated development environment. The complex object generator includes a hierarchical object relationship data structure describing classes of objects, relationships between the classes of objects, and metrics associated with the classes of objects. The hierarchical object relationship data structure is parsed by parser to create a hierarchy of Java classes. A user interface uses the hierarchy of Java classes to constrain selection of objects and metrics during creation of the complex object. As input is received relative to selected objects and metrics, the complex object is incrementally built. By constraining object and metric selection using the hierarchy of Java classes, the complex object is guaranteed to be valid when built, thus reducing or eliminating the number of errors associated with building complex objects.

12 Claims, 6 Drawing Sheets

```
<GetMetricParams>                                                    ← 210
]   <System ParameterType="System">
]       <Directors ParameterType="DirectorSet"... >                  ← 330
]       <FrontEndPorts ParameterType="PortSet">
]           <FaPort ParameterType="Port"
]               <PortSpeed Any="true" ParameterType="PortSpeed" ... >
]               <Metrics ParameterType="Metric">
]                   <MetricNames Utilization="true" IO="true" Throughput="true"/>
]                   <MetricOptions Max="true" Average="true"/>
]       320     </Metrics>
]           </FaPort>
] 305       <FePort ParameterType="Port" ... >
]           <FnPort ParameterType="Port" ... >
]           <SePort ParameterType="Port" ... >
]           <EfPort ParameterType="Port" ... >
]       </FrontEndPorts>
]       <BackEndPorts ParameterType="PortSet" ... >                  ← 325
]       <RdfPorts ParameterType="PortSet" ... >     ← 315
]       <Disks ParameterType="DiskSet" ... >        ← 316
]       <Boards ParameterType="BoardAll" ... >      ← 317
]       <Metrics ParameterType="Metric" ... >       ← 318
]   </System>

]   </Board Argument1_Name="id" Argument1_Type="int" ParameterType="Board">
]       <Directors ParameterType="DirectorSet" ... >
]       <FrontEndPorts ParameterType="PortSet" ... >
]   310 <BackEndPorts ParameterType="PortSet" ... >
]       <RdfPorts ParameterType="PortSet" ... >
]       <Disks ParameterType="DiskSet" ... >
]       <Metrics ParameterType="Metric" ... >
]   </Board>
</GetMetricParams>
```

```
public abstract class GetMetricParams {
    public static System System () { return new System(); }
    public static class System implements IParameter {
        public ParameterType getParameterType () { return ParameterType.System; }
        private System() { }
        public IParameter getParent() { return null; } public Directors Directors() { return new Directors(parent: this); }
        public class Directors implements IParameter { . . . } public FrontEndPorts FrontEndPorts() { return new FrontEndPorts(parent: this); }
        public class FrontEndPorts implements IParameter { . . . } public BackEndPorts BackEndPorts() { return new BackEndPorts(parent: this); }
        public class BackEndPorts implements IParameter { . . . } public RfdPorts RfdPorts() { return new RfdPorts(parent: this); }
        public class RfdPorts implements IParameter { . . . } public Disks Disks() { return new Disks(parent: this); }
        public class Disks implements IParameter { . . . } public Boards Boards() { return new Boards(parent: this); }
        public class Boards implements IParameter { . . . }
            public ParameterType getParameterType() { return ParameterType.Board }
            public System parent;
            public Iparameter getParent() { return this.parent }
            private Boards(System parent) { this.parent = parent; }
            public Metric Metric(MetricName.Utilization metric) { return new
            Metric(parent: this, metric) }
            public Metric Metric(MetricName.Utilization metric, MetricType metricType)
            { return new Metric(parent: this, metric) }
            public class Metric implements IMetricParm, IParameter { . . . }
                Boards parent;
```

FIG.6

METHOD AND APPARATUS FOR HIERARCHICAL GENERATION OF A COMPLEX OBJECT

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

FIELD

This disclosure relates to computing systems and related devices and methods, and, more particularly, to a method and apparatus for hierarchical generation of a complex object.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

A complex object generator is implemented, for example, as an integrated development environment. The complex object generator includes a hierarchical object relationship data structure describing classes of objects, relationships between the classes of objects, and metrics associated with the classes of objects. The hierarchical object relationship data structure is parsed by parser to create a hierarchy of object classes, such as a hierarchy of Java classes. A user interface uses the hierarchy of Java classes to constrain selection of objects and metrics during creation of the complex object. As input is received relative to selected objects and metrics, the complex object is incrementally built. By constraining object and metric selection using the hierarchy of Java classes, the complex object is guaranteed to be valid when built, thus reducing or eliminating the number of errors associated with building complex objects.

BRIEF DESCRIPTION OF THE DRAWINGS

FIG. 5 is an example portion of a hierarchy of Java classes created by parsing the hierarchical object relationship data structure of FIG. 4, according to some embodiments.

DETAILED DESCRIPTION

Figure 1:
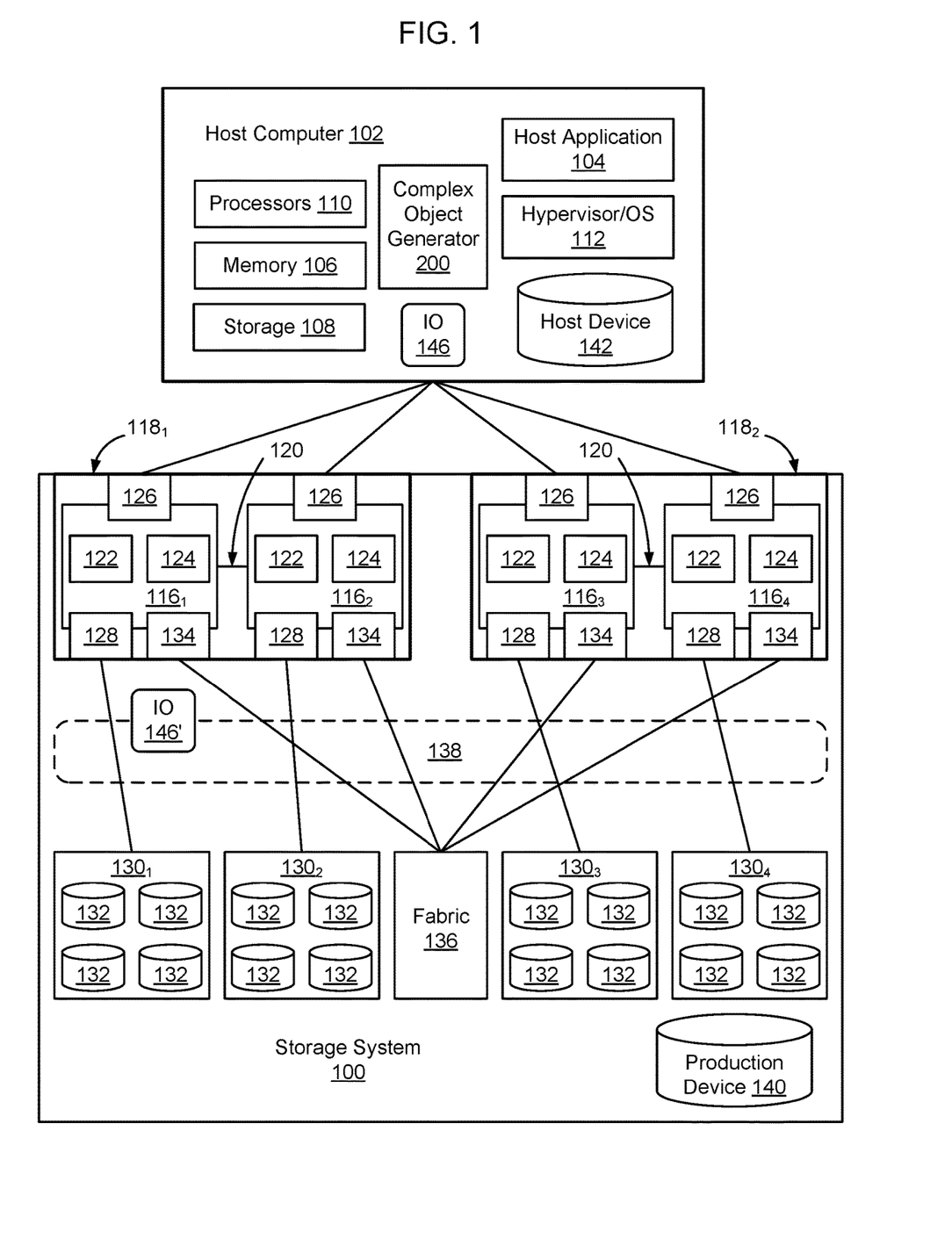
FIG. 1 is a functional block diagram of an example storage system connected to a host computer, according to some embodiments.

Aspects of the inventive concepts will be described as being implemented in connection with a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, software, computer instructions that are stored on a non-transitory tangible computer-readable medium and implemented by multi-purpose tangible processors, and any combinations thereof.

FIG. 1 illustrates a storage system 100 and an associated host computer 102, of which there may be many. The storage system 100 provides data storage services for a host application 104, of which there may be more than one instance and type running on the host computer 102. In the illustrated example the host computer 102 is a server with volatile memory 106, persistent storage 108, one or more tangible processors 110, and a hypervisor or OS (Operating System) 112. The processors 110 may include one or more multi-core processors that include multiple CPUs, GPUs, and combinations thereof. The volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (enterprise flash drives), SATA (Serial Advanced Technology Attachment) drives, and FC (Fibre Channel) drives. The host computer 102 might support multiple virtual hosts running on virtual machines or containers, and although an external host computer 102 is illustrated, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine is implemented using a single physical enclosure and provides a logical separation between itself and other storage engines 118 of the storage system 100. A given storage system 100 may include one or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$ using a PCIe bus, or may be connected to the compute nodes $116_1$-$116_4$, for example, by an IB (InfiniBand) bus or fabric.

In some embodiments, each compute node 116 also includes one or more CAs (Channel Adapters) 134 for communicating with other compute nodes 116 directly or via an interconnecting fabric 136. An example interconnecting fabric may be implemented using InfiniBand.

Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access).

The storage system 100 maintains data for the host applications 104 running on the host computer 102. For example, host application 104 may write host application data to the storage system 100 and read host application data from the storage system 100 in order to perform various functions. Examples of host applications 104 may include but are not limited to file servers, email servers, block servers, and databases.

Logical storage devices are created and presented to the host application 104 for storage of the host application data. For example, a production device 140 and a corresponding host device 142 are created to enable the storage system 100 to provide storage services to the host application 104. The host device 142 is a local (to host computer 102) representation of the production device 140. Multiple host devices 142 associated with different host computers 102 may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses on various different managed drives 132 on storage system 100.

In some embodiments, the storage system 100 maintains metadata that indicates, among various things, mappings between the production device 140 and the locations of extents of host application data in the shared global memory 138 and the managed drives 132. In response to an IO (Input/Output command) 146 from the host application 104 to the host device 142, the hypervisor/OS 112 determines whether the IO 146 can be serviced by accessing the host computer memory 106. If that is not possible then the IO 146 is sent to one of the compute nodes 116 to be serviced by the storage system 100.

There may be multiple paths between the host computer 102 and the storage system 100, e.g. one path per front-end adapter 126. The paths may be selected based on a wide variety of techniques and algorithms including, for context and without limitation, performance and load balancing. In the case where IO 146 is a read command, the storage system 100 uses metadata to locate the commanded data, e.g. in the shared global memory 138 or on managed drives 132. If the commanded data is not in the shared global memory 138, then the data is temporarily copied into the shared global memory from the managed drives 132 and sent to the host application 104 via one of the compute nodes $116_1$-$116_4$. In the case where the IO 146 is a write command, in some embodiments the storage system 100 copies a block being written into the shared global memory 138, marks the data as dirty, and creates new metadata that maps the address of the data on the production device 140 to a location to which the block is written on the managed drives 132. The shared global memory 138 may enable the production device 140 to be reachable via all of the compute nodes $116_1$-$116_4$ and paths, although the storage system 100 can be configured to limit use of certain paths to certain production devices 140.

There are many ways to configure a storage system 100 such as the storage system of FIG. 1. For example, in some embodiments, the number of storage engines 118 is configurable such that a given storage system 100 may be configured to have anywhere between 1 and 8 storage engines 118. Likewise, in some embodiments the number of back-end drive arrays 130 is configurable, such that the storage system 100 may be configured to have anywhere between 2 and 16 back-end drive arrays 130. Additionally, within each component, there are options to customize the particular type of components that are used. For example, the type of front-end adapter, back-end adapter, amount of cache, and number of CPU cores may all be configured for a given system board, compute node 116, storage engine 118, or other aspect of storage system 100.

One way to configure a storage system is to create a complex object representing the storage system. Complex objects are advantageous in this regard, because once created the complex object can enable the selected components to be validated, for example to ensure that there is no duplication in the called objects and that the scope of the complex object is well defined.

Unfortunately, complex object generation is currently implemented using a flat selection model of objects and metrics for the objects, which requires validation to occur after creation of the complex object. Post creation validation enables errors to be found in the complex object, but does not prevent the errors from occurring, which can result in a recursive process in which the complex object is built, the object is validated, and errors are identified which must be corrected. This process can iterate several times before the complex object is finally determined to be valid, which takes undue time. Likewise, since it is not clear which objects are able to be used together, or which metrics are required for which objects, creation of a complex object traditionally relies on the skill of the person who is creating the complex object. Accordingly, even once the complex object is ultimately validated, the resulting complex object may not be optimal if the person implementing the complex object did not know that it was possible for particular objects and metrics to be validly included in the complex object during the creation process.

According to some embodiments, a complex object generator 200 is implemented (see FIG. 2), for example, as an integrated development environment. The complex object generator includes a hierarchical object relationship data structure 210 describing classes of objects, relationships between the classes of objects, and metrics associated with the classes of objects. The hierarchical object relationship data structure 210 is parsed by parser 230 to create a hierarchy of object classes such as a hierarchy of Java classes 240. A user interface 220 uses the hierarchy of Java classes 240 to constrain selection of objects and metrics during creation of the complex object 250. As input is received relative to selected objects and metrics, the complex object 250 is incrementally built. By constraining object and metric selection using the hierarchy of Java classes 240, the complex object 250 is guaranteed to be valid when built, thus reducing or eliminating the number of errors associated with building complex objects. In some embodiments the hierarchical object relationship data structure 210 is implemented in XML and the parser is implemented to generate a hierarchy of Java classes. Although some embodiments are described in which the complex object generator 200 is used to generate a complex object 250 representing a storage system 100, the complex object generator 200 can similarly be used to generate complex objects of many types.

Figure 2:
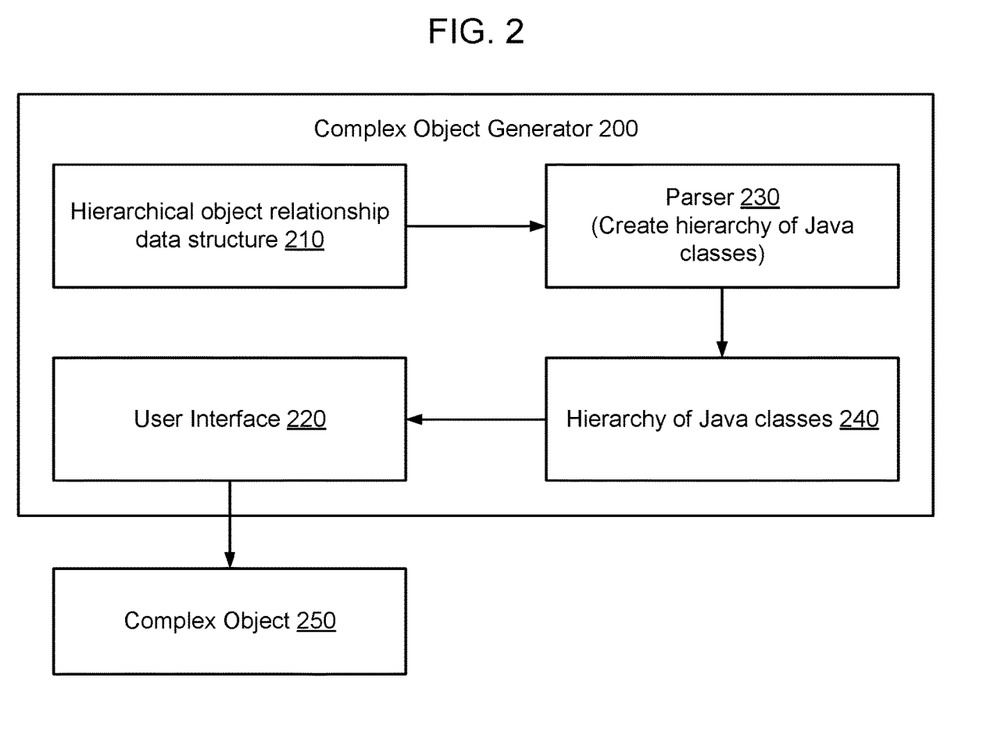
FIG. 2 is a functional block diagram of an example complex object generator, according to some embodiments.

FIG. 2 is a functional block diagram of a complex object generator 200, according to some embodiments. As shown in FIG. 2, in some embodiments the complex object generator includes a hierarchical object relationship data structure 210 containing hierarchical representation of classes of objects and metrics that each class of objects requires. The hierarchical object relationship data structure 210, in some embodiments, is implemented using XML. A parser 230 parses the hierarchical object relationship data structure 210 to create a hierarchy of object classes. In some embodiments, the hierarchy of object classes is implemented using Java. Although some embodiments are described herein in which the hierarchy of object classes is implemented using Java, a hierarchy of other types of object classes may likewise be used depending on the implementation.

The hierarchy of Java classes 240 is used to control presentation of objects and metrics to the user via a user interface 220 of an integrated development environment. As input is received via the user interface 220, the hierarchy of Java classes 240 constrains selection of objects for inclusion in the complex object 250. Thus, as input is received relative to selection of objects for inclusion in the complex object, the structure of the hierarchy of Java classes 240 created by parsing the hierarchical object relationship data structure 210 determines what additional objects and metrics are available for selection via the user interface 220 at lower levels of the parsed hierarchical object relationship data structure 210.

Thus, when an object is selected corresponding to a given level on a given branch of the hierarchical object relationship data structure 210, all metrics associated with the selected object and all valid next level objects on that branch are presented as options for inclusion in the complex object via the user interface 220. Metrics that are not able to be specified on the object at the given level and branch are not presented, and likewise next level objects that cannot be validly included in the complex object are not presented as options in the user interface 220. In this manner, the parsed hierarchical object relationship data structure 210 constrains selection of objects in connection with creation of the complex object 250 to ensure that the complex object 250, once created, is valid.

Since all available valid choices are presented through user interface 220 as the parsed hierarchical object relationship data structure 210 is traversed, the resultant complex object 250 is more likely to be optimal and less dependent on the skill of the person building the complex object 250. Although an implementation will be described in which the hierarchical object relationship data structure 210 is parsed to create a hierarchy of Java objects, in some embodiments a different parser 230 may be used.

Figure 3:
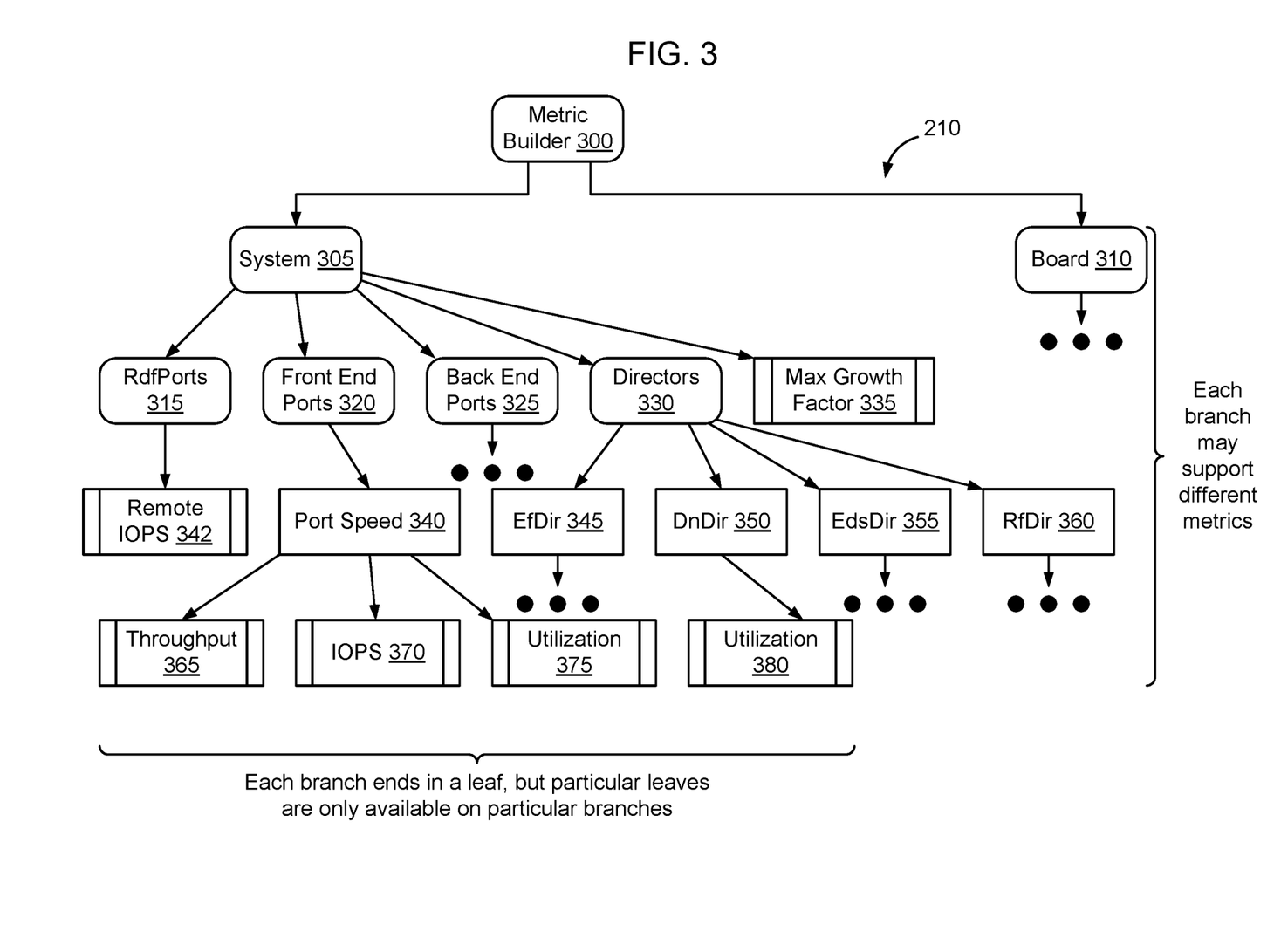
FIG. 3 is a functional block diagram of a hierarchical object relationship data structure containing an example hierarchical representation of a class of objects and associated metrics, according to some embodiments.

FIG. 3 is a functional block diagram of a hierarchical object relationship data structure 210 containing an example hierarchical representation of an example selection of objects and associated metrics, according to some embodiments. In some embodiments, the hierarchical object relationship data structure 210 is implemented using XML (eXtensible Markup Language) although other ways of implementing the hierarchical object relationship data structure 210 may be used depending on the implementation.

In the example hierarchical object relationship data structure 210 shown in FIG. 3, the hierarchical object relationship data structure 210 has a top-level object 300 labeled "Metric Builder". Depending from the top-level object are two first-level objects 305, 310, labeled "System" and "Board". Below system object 305 there is a tree of additional objects 315-330. A similar tree of objects may exist below board object 310, but has not been included in the diagram due to space constraints. Likewise, the hierarchical object relationship data structure 210 may have multiple additional first-level objects, and the particular selection shown in FIG. 3 is merely to provide context for explanation of some concepts associated with use of the hierarchical object relationship data structure 210 in connection with generation of a complex object 250. Each path from an object at a lower level to the top-level object (root node) represents a "branch" in the hierarchical object relationship data structure 210 as that term is used herein.

In some embodiments, the hierarchical object relationship data structure 210 is parsed to create a hierarchy of Java classes 240, which is then used to constrain the options presented via user interface 220, to prevent receipt of input via the user interface 220 that would cause conflicting objects or conflicting metrics to be added to the complex object 250. For example, assume that input is received via user interface that indicates that system object 305 is selected. Based on this input, a constrained subset of objects is presented via the user interface 220 which, in FIG. 3, includes RdfPorts object 315, Front End Ports object 320, Back End Ports object 325, and directors 330. The particular selection of lower level objects and metrics depends on the location (branch and level) of the selected object in the hierarchy. By constraining the possible input through the user interface based on the parsed hierarchical object relationship data structure 210, it is possible to prevent conflicting objects and metrics from being added to the complex object 250.

The hierarchy of Java classes 240 may also cause the user interface 220 to display one or more parameters (referred to herein as "metrics") associated with the selected object. For example, in FIG. 3 one of the available metrics that may be displayed or which may be used to receive input in connection with creating a complex object, based on the selected system object 305, is MaxGrowthFactor 335. In some instances, a metric associated with a given object is static (not able to be specified by the user). In other instances, the metric associated with a given object is able to be specified by the user. For example, assume in FIG. 3 that the max growth factor metric 335 relates to the maximum amount of increase in workload that the storage system can handle. For example, if the max growth factor is 5, that means that it is possible to multiple the current workload by 5 times to get to 100% utilization of one of the components. By enabling this metric to be specified at the system level (under system object 305) the metric is able to be applied to the system as a whole.

The hierarchy of Java classes 240 generated by parsing the hierarchical object relationship data structure 210 of FIG. 3 may have multiple branches, each of which may have collections of objects and metrics at multiple levels. Each time input is received relative to an object at a given level, that input constrains subsequent input relative to other lower level objects in the parsed hierarchical object relationship data structure 210. For example, in FIG. 3 if input is received via user interface 220 indicating that object 320 has been selected at layer 2, then the hierarchy of Java classes 240 constrains subsequent input via the user interface to limit the subsequent input to object 340. Similarly, if input is received via user interface 220 indicating that object 330 has been selected at layer 2, then the hierarchy of Java classes 240 constrains subsequent selection of objects available at layer 3 to only objects 345, 350, 355, and 360. Object 340, which exists in layer 3 of the hierarchical representation, is not available to be selected via user interface 220 once input is received indicating that object 330 was selected at layer 2, because object 340 is contained, in hierarchical object relationship data structure 210, on a different branch.

Many branches may be taken to traverse the hierarchy of Java classes 240. At the lowest level of the hierarchical object relationship data structure 210 are the leaves, referred to herein as metrics. In some embodiments, all branches end at a metric, such that it is not possible to reach an end of a branch without at least one metric. Because of space constraints, some branches in FIG. 3 end with an arrow and a set of dots, indicating that there the branch includes possibly one or more additional levels of objects, and one or more metrics at the end of the branch. The metrics may be static or user selectable, depending on the implementation. For example, in FIG. 3 if object 340 is selected in layer 3, then metrics 365, 370 and 375 are accessible, whereas if object 350 is selected in layer 3, then metric 380 is accessible. The same metric may appear as a leaf on multiple branches. For example, in some embodiments many of the branches end with the throughput metric 365, IOPS metric 370, and Utilization metric 375.

Figure 4:
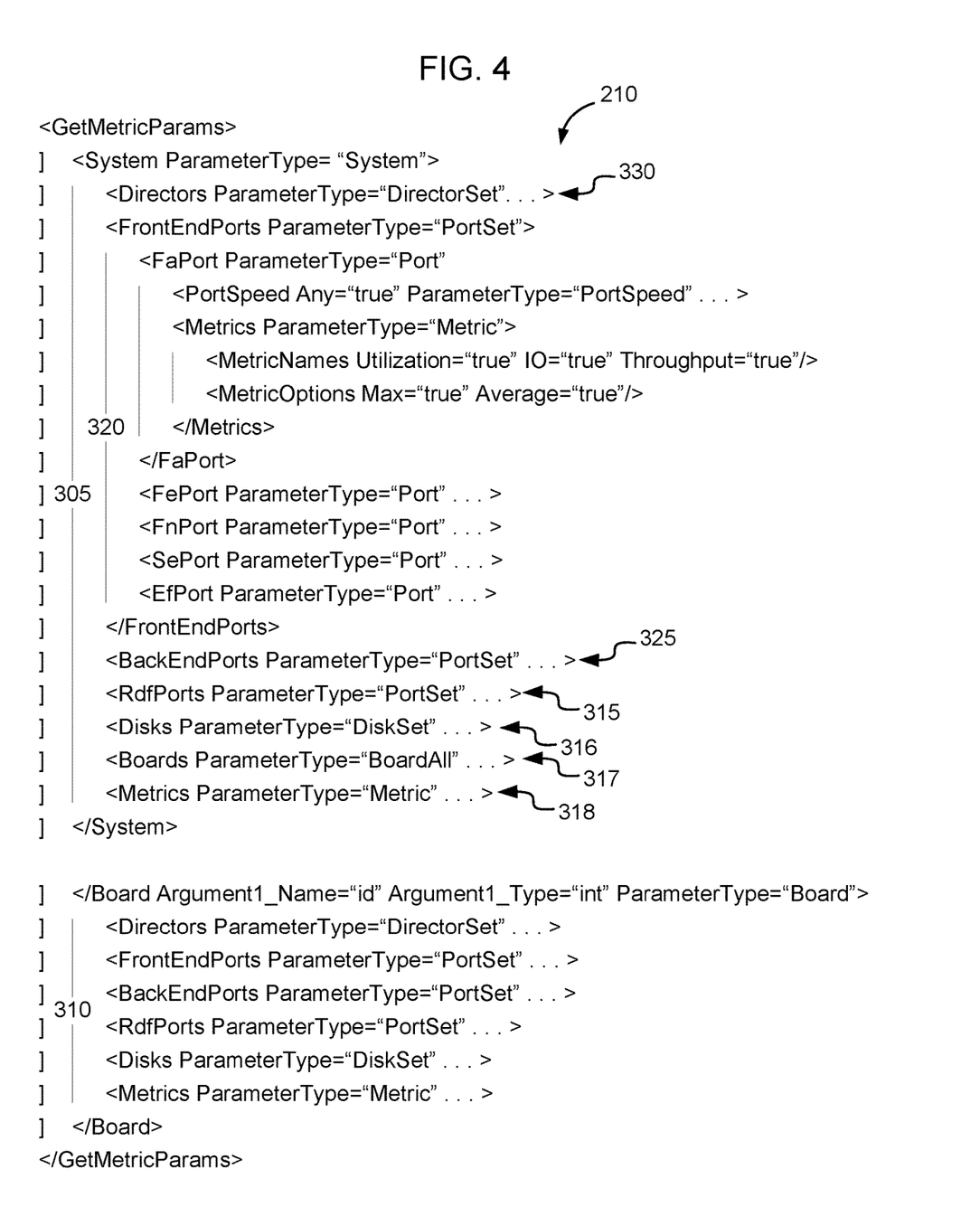
FIG. 4 is an example portion of an example hierarchical object relationship data structure implemented using XML, according to some embodiments.

In some embodiments, the hierarchical object relationship data structure 210 is implemented using XML. FIG. 4 is an example portion of an example hierarchical object relationship data structure 210 implemented using XML, according to some embodiments. Each line of XML code in FIG. 4 represents either an object or a metric. In the example shown in FIG. 4, the hierarchical object relationship data structure 210 includes a top-level object <GetMetricParams>. Below the top-level object are two first-level objects: <System> object 305 and <Board> object 310. Under <System> object 305, there are eight second-level objects: <Directors> object 330, <FrontEndPorts> object 320, <BackEndPorts> object 325, <RdfPorts> object 315, <Disks> object 316, <Boards> object 317, and <Metrics> object 318.

In FIG. 4, the dots " . . . " at the end of a line indicates that there are additional objects in lower layers of the hierarchical object relationship data structure 210 associated with that particular object. To see those object, the particular line can be clicked which causes the hidden XML code to be displayed. For example, in FIG. 4, the XML line for object 305 has been selected, and the XML line for object 320 has been selected, showing the XML representing lower levels of the hierarchical object relationship data structure 210 to be expanded. For example, in FIG. 3, by selecting the XML line for object 320, the next level objects <FAPort>, <FePort>, <FnPort>, <SePort>, and <EfPort> are shown. In this example, one of the next level objects <FaPort> has been selected which caused the available metrics for that next level object to be displayed.

In some embodiments, the hierarchical object relationship data structure 210 is parsed to create the hierarchy of Java classes 240, which is used to constrain input via the user interface 220, such that the user is presented with a set of options in the user interface in cascading list form. When the user provides input via the user interface, for example by clicking on a particular entry corresponding to a first level of the hierarchical object relationship data structure 210, a set of new entries will be displayed below the selected entry to cause the user interface 220 to display the universe of possible options at the next level of the hierarchical object relationship data structure 210 on that branch. Each time input is received relative to an entry at a subsequent level, the user interface 220 is adjusted to display options at the next level on that branch of the hierarchical object relationship data structure 210, to form a cascading display of options that the user can use to select objects and metrics to be added to the complex object 250.

FIG. 5 is an example hierarchy of Java classes 240 created by parsing the hierarchical object relationship data structure 210 of FIG. 4, according to some embodiments. The hierarchy of Java classes 240 is used by the complex object generator 200 to constrain selection of objects and metrics, such that as input is received via user interface 220 relative to objects and metrics that are to be included in the complex object 250, the integrated development environment will propose to the user only the components of the hierarchy of Java classes that are available at the next level. This enables the complex object 250 to be incrementally built while ensuring the validity of the resulting complex object 250. Although FIG. 5 shows an implementation of a hierarchy of Java classes (in Java), other forms of hierarchies of objects may be created depending on the implementation.

Using a normal builder, that is not hierarchical based, a user would be presented with all options in a single flat level. Tools of this nature required the user to choose from a flat list of perhaps one hundred choices of objects and metrics, and the same flat list is presented to the user for every object and metric selection. Further, these tools did not prevent the user from making illegal combinations that included incompatible objects or metrics that weren't supported by the object. Similarly, the user was not prevented from building the same component twice. By providing a complex object generator 200 that is implemented as a hierarchical object builder, the complex object generator 200 is able to prevent a user from making incompatible choices of objects, selecting incorrect metrics for the objects, or inadvertently creating the same object multiple times, thus ensuring that the resultant complex objects will be valid.

Figure 6:
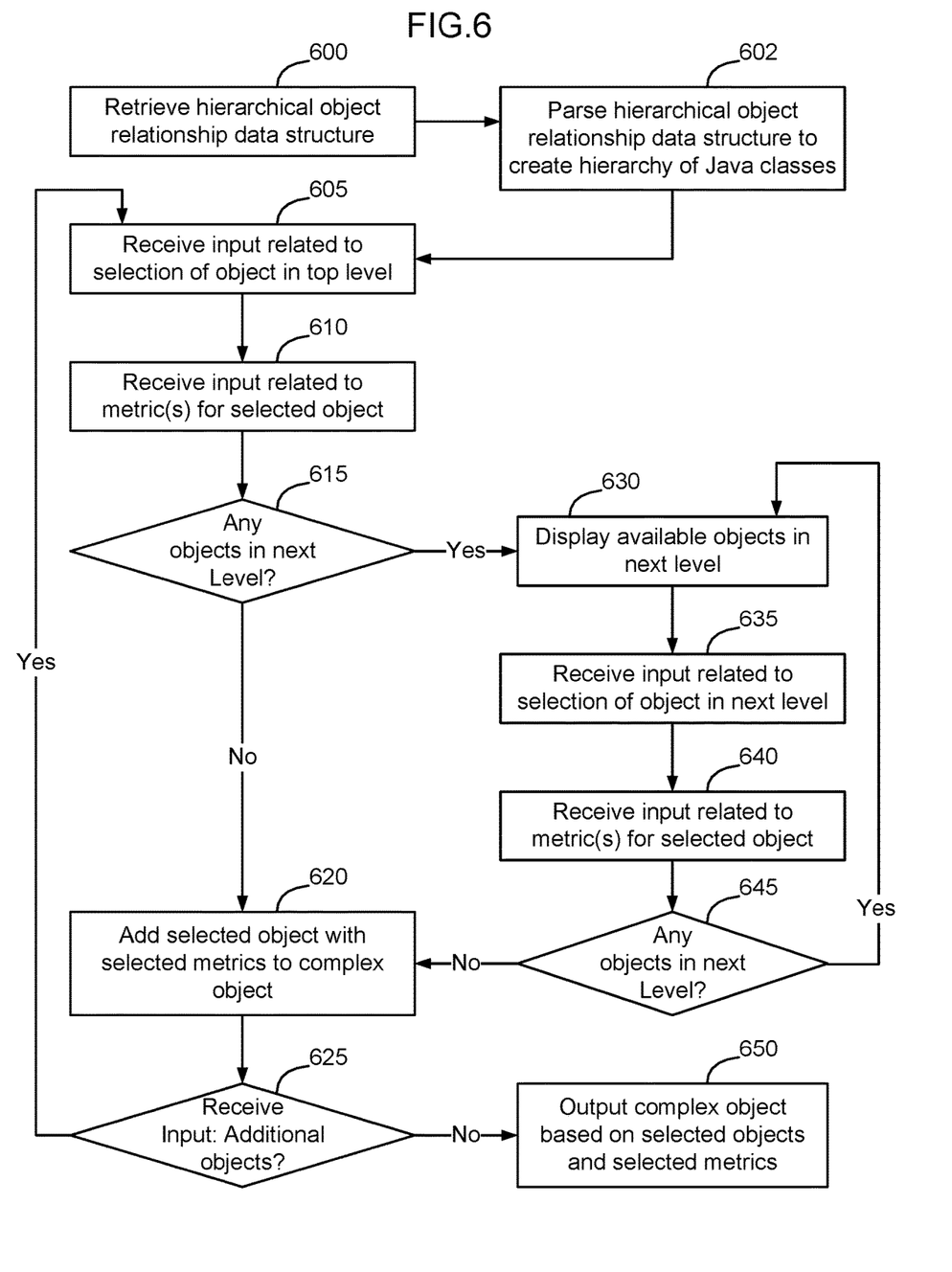
FIG. 6 is a flow chart of a method of hierarchical generation of a complex object, according to some embodiments.

FIG. 6 is a flow chart of a method of hierarchical generation of a complex object, according to some embodiments. As shown in FIG. 6, in some embodiments a hierarchical object relationship data structure 210 containing a hierarchical representation of objects and metrics is retrieved (block 600).

The hierarchical object relationship data structure 210 defines the constraints that are required to be applied to objects defining the system that is to be described by the complex object. For example, in an implementation in which XML is used to implement the hierarchical representation 210, an XML editor may be used to describe, in XML, the hierarchical relationship between objects and constraints that must be enforced when creating a complex object. In an implementation where the hierarchical object relationship data structure 210 is to be used to create complex objects describing physical systems, the constraints may be based on constraints associated with the physical systems. For example, if it is not possible to use a particular type of front-end adapter on a particular type of storage engine 118, that exclusion will be implemented in the hierarchical object relationship data structure 210 during creation of the hierarchical object relationship data structure 210, by not including an object for the incompatible front-end adapter on that branch below the object for the particular storage engine.

The retrieved hierarchical object relationship data structure 210 is then parsed to create a hierarchy of Java classes 240 (block 602). The hierarchy of Java classes 240 is used to constrain input via user interface 220 to control selection of objects and metrics for inclusion in the complex object during generation of the complex object 250.

Input is then received, via user interface 220, relative to selection of an object in the top level of the hierarchy of Java classes 240 (block 605). Optionally, further input may be received relative to one or more metrics associated with the selected object (block 610).

Based on input received relative to the object selected in the top level, a determination is then made if there are any objects located in the next level of that branch of the hierarchy of Java classes 240 (block 615). If there are no objects located in the next level of that branch of the hierarchy of Java classes 240 (a determination of NO at block 615), the selected object with the selected metrics is added to the complex object (block 620).

If there are objects located in the next level of that branch of the hierarchy of Java classes 240 (a determination of YES at block 615), the available objects are displayed via the user interface 220 (block 630). At block 635, input is received relative to selection of an object in the next level block 635, and further input about the metrics for the selected object are optionally received at block 640.

Based on the input received relative to the object selected in block 635, a determination is made as to whether there are any objects in the next level on that branch (block 645). If there are objects in the next level on that branch (a determination of YES at block 645) the process returns to block 630 where the objects in the next level are displayed. At block 635, input is received relative to one of the objects in the next lower level of the hierarchy of Java classes 240, and further input about the metrics for the selected object are optionally received at block 640. The process of blocks 630, 635, 640, and 645 iterates for multiple levels until there are no objects at lower levels of the hierarchical object relationship data structure 210 (a determination of NO at block 645), at which point the object is added to the complex object (block 620). In some embodiments, each branch of the hierarchy of Java classes 240 ends with a metric which is either static value or a user selectable value which is selected in block 640.

Once an object is added to the complex object (block 620) further input is received indicating whether additional objects should be added to the complex object (block 625). If input is received via user interface 220 indicating that additional objects are to be added (a determination of YES at block 625) the process returns to block 605 to select a top-level object. If input is received via user interface 220 indicating that no additional objects are to be added (a determination of NO at block 625) the process outputs a complex object 250 based on the selected objects and selected metrics. By constraining choices of objects and metrics, it is possible to greatly simplify the creation of complex objects while ensuring their validity. By displaying, via the user interface, all available options at each level of the respective branch of the hierarchy of Java classes 240, it is possible to create more optimal complex objects 250, while relying less on the skill of a person using the complex object generator 200.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for hierarchical generation of a complex object, the computer program including a set of instructions which, when executed by a computer, cause the computer to perform a method comprising the steps of:
   retrieving a hierarchical object relationship data structure;
   parsing the hierarchical object relationship data structure to create a hierarchy of object classes;
   receiving first input via a user interface relative to a first object at a first level of the hierarchy of object classes;
   using the received first input and the hierarchy of object classes to determine a subset of second objects at a second level on a first branch of the hierarchy of object classes;
   displaying only the only the second subset of objects relative to the first object on the user interface to constrain subsequent input via the user interface;
   receiving second input related to selection of one of the subset of second objects;
   determining if there are additional objects in the hierarchy of object classes at a next lower level below the selected one of the subset of second objects on the first branch of the hierarchy of object classes;
   if there are additional objects in the hierarchy of object classes at the next lower level:
      using the selected one of the subset of second objects and the hierarchy of object classes to determine a subset of next lower level objects on the first branch of the hierarchy of object classes; and
      displaying only the only the subset of next lower level objects on the user interface to constrain subsequent input via the user interface if there are not additional objects in the hierarchy of object classes at the next lower level:
      adding the first object to the complex object to incrementally build the complex object; and
   outputting the complex object based on selected objects and metrics.

2. The non-transitory tangible computer readable storage medium of claim 1, wherein the hierarchical object relationship data structure is created using XML (eXtensible Markup Language), and the hierarchy of object classes is parsed to create a hierarchy of Java classes.

3. The non-transitory tangible computer readable storage medium of claim 1, wherein the hierarchy of object classes includes a plurality of branches, at least some of the branches including objects at multiple levels, and each branch ending with at least one metric.

4. The non-transitory tangible computer readable storage medium of claim 1, further comprising receiving second input via the user interface relative to a first metric of the first object.

5. The non-transitory tangible computer readable storage medium of claim 1, further comprising receiving third input via the user interface relative to a second metric of the selected one of the subset of second objects.

6. The non-transitory tangible computer readable storage medium of claim 1, further comprising iterating the steps of determining if there are additional objects in the hierarchy of object classes at a next lower level, using the selected one of the subset of second objects and the hierarchy of object classes to determine a subset of next lower level objects, and displaying only the only the subset of next lower level objects on the user interface until it is determined that there are not additional objects in the hierarchy of object classes at the next lower level.

7. A method of hierarchical generation of a complex object, comprising the steps of:
   retrieving a hierarchical object relationship data structure;
   parsing the hierarchical object relationship data structure to create a hierarchy of object classes;
   receiving first input via a user interface relative to a first object at a first level of the hierarchy of object classes;
   using the received first input and the hierarchy of object classes to determine a subset of second objects at a second level on a first branch of the hierarchy of object classes;
   displaying only the only the second subset of objects relative to the first object on the user interface to constrain subsequent input via the user interface;
   receiving second input related to selection of one of the subset of second objects;
   determining if there are additional objects in the hierarchy of object classes at a next lower level below the selected one of the subset of second objects on the first branch of the hierarchy of object classes;
   if there are additional objects in the hierarchy of object classes at the next lower level:
      using the selected one of the subset of second objects and the hierarchy of object classes to determine a subset of next lower level objects on the first branch of the hierarchy of object classes; and
      displaying only the only the subset of next lower level objects on the user interface to constrain subsequent input via the user interface if there are not additional objects in the hierarchy of object classes at the next lower level:
      adding the first object to the complex object to incrementally build the complex object; and
   outputting the complex object based on selected objects and metrics.

8. The method of claim 7, wherein the hierarchical object relationship data structure is created using XML (eXtensible Markup Language), and the hierarchy of object classes is parsed to create a hierarchy of Java classes.

9. The method of claim 7, wherein the hierarchy of object classes includes a plurality of branches, at least some of the branches including objects at multiple levels, and each branch ending with at least one metric.

10. The method of claim 7, further comprising receiving second input via the user interface relative to a first metric of the first object.

11. The method of claim 7, further comprising receiving third input via the user interface relative to a second metric of the selected one of the subset of second objects.

12. The method of claim 7, further comprising iterating the steps of determining if there are additional objects in the hierarchy of object classes at a next lower level, using the selected one of the subset of second objects and the hierarchy of object classes to determine a subset of next lower level objects, and displaying only the only the subset of next lower level objects on the user interface until it is determined that there are not additional objects in the hierarchy of object classes at the next lower level.

\* \* \* \* \*